INVENTOR.
ANTHONY J. SORCHY
ATTORNEYS.

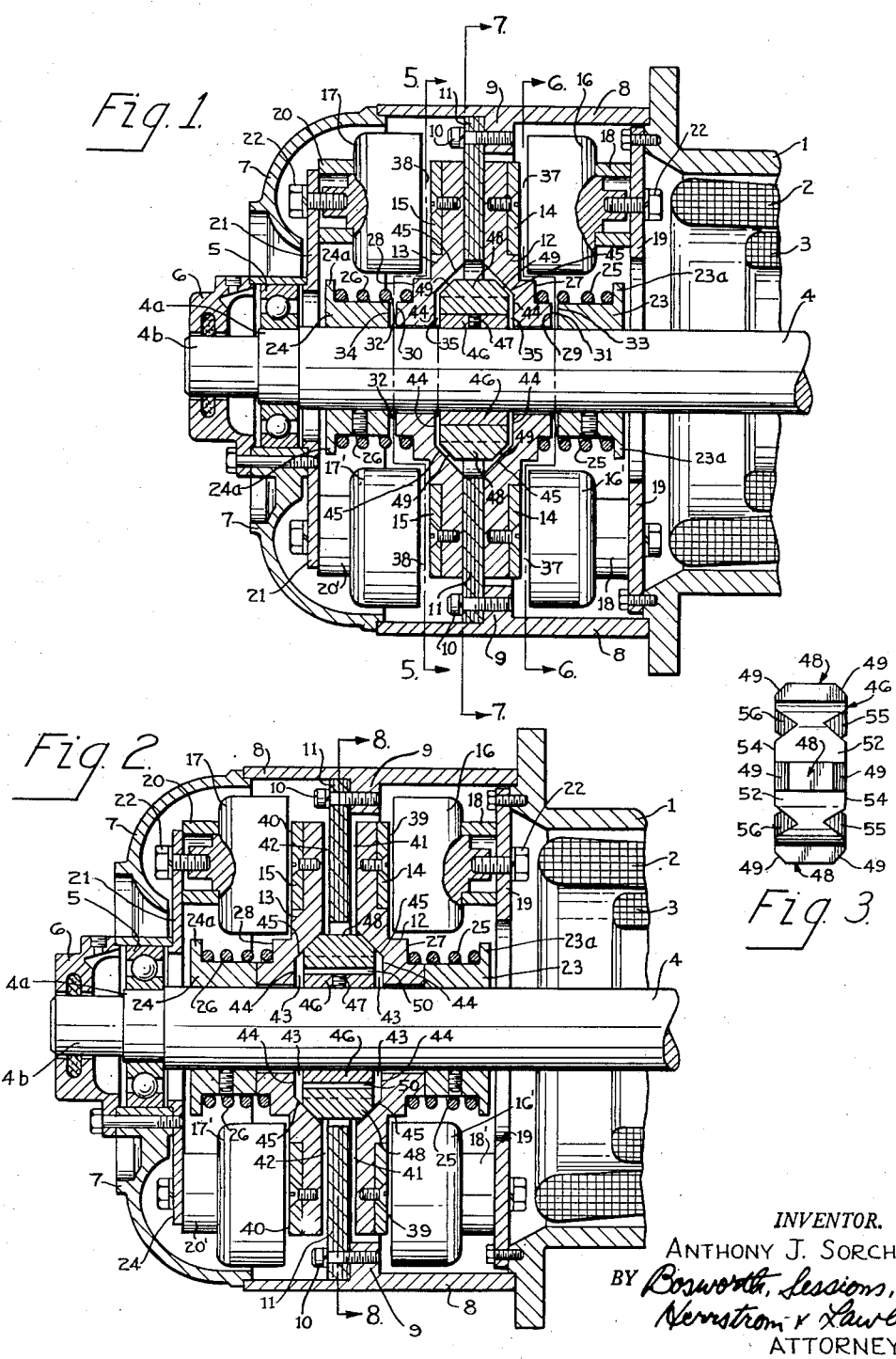

March 18, 1958  A. J. SORCHY  2,827,135
DRIVE-RELEASED BRAKE FOR MOTORS AND THE LIKE
Filed Dec. 21, 1954  3 Sheets-Sheet 3

INVENTOR.
ANTHONY J. SORCHY
BY
ATTORNEYS.

United States Patent Office 2,827,135
Patented Mar. 18, 1958

2,827,135

DRIVE-RELEASED BRAKE FOR MOTORS AND THE LIKE

Anthony J. Sorchy, Cleveland, Ohio, assignor to The Cleveland Electric Motor Company, Cleveland, Ohio, a corporation of Ohio Application December 21, 1954, Serial No. 476,793

22 Claims. (Cl. 188—166)

This invention relates to a brake for a dynamo-electric machine and, particularly, to a drive-released brake for a motor or the like.

In general, brakes for motors have in the past been of one or the other of two types; viz., mechanical and electrical, although even in the case of the latter there have usually been mechanical elements such as springs which have played a part in braking the motor or releasing it from brake-set position. As heretofore known, both types of brakes have had disadvantages. In the case of electric brakes, which as a rule depend primarily upon the use of solenoids or electro-magnets, the action tends to be abrupt, sometimes developing a pronounced hammer effect upon energization or de-energization of the motor. In the case of mechanical brakes, the hammer effect usually is lacking, but instead the brake in many cases has a decided tendency to "chatter" in moving between brake-set and brake-released positions.

It is an object of the present invention to provide a brake for a motor or the like which is characterized by prompt, sure but nevertheless easy movement between brake-set and brake-released positions, which is free of any appreciable hammer effect, and which at the same time is devoid of any tendency to "chatter." By contrast with the action of many of the brakes of the prior art, mechanical and electrical, the action of the mechanical brake of the present invention begins almost immediately upon de-energization of the motor, is accomplished in progressive fashion in a very short period of time, and is characterized throughout by a high degree of smoothness. Similarly, on release of the brake from brake-set position, the action is virtually immediate, progressive in nature, and of short over-all duration.

A further object of the invention is to provide a mechanical brake in which the parts are biased toward brake-set position but in which, immediately after the motor is put into operation, speed-responsive means operating under the influence of centrifugal forces begin to exercise a countervailing action on the biasing means. During the time the motor is running, the countervailing action of the speed-responsive means renders the biasing means ineffective, thus permitting the brake shoe or other movable braking element or elements to move into and to remain in brake-released position. When, however, the flow of current is interrupted, the biasing means prevail over the speed-responsive means, causing the movable braking element or elements to move promptly but noiselessly into braking engagement with suitable stationary braking means.

A further object of the invention is to provide a drive-released brake of this kind in which the initial action incident to release of the brake from brake-set position is accomplished by co-acting mechanical elements of the nature of a cam and cam follower; in which, after the initial release has been effected other mechanical elements actuated by centrifugal forces come into operation to assist in releasing the brake; and in which, thereafter, part of the force required to move the brake into and hold it in brake-released position is supplied by one or more magnets which are ineffective during the early stages of release of the brake but which become effective after such release has been partly accomplished. On de-energization of the motor, following retraction of the centrifugally actuated mechanical elements, spring means come into operation to overcome the effect of the magnet or magnets and urge the movable components of the brake into brake-set positions.

Although in its preferred form the invention makes use of magnets for the purposes just mentioned, such magnets are not sufficiently powerful to prevent return of the brake components to brake-set position when the current to the motor is inerrupted nor do they in and of themselves accomplish the initial release of the brake from brake-set position when the circuit is closed. Such magnets, which may be electro-magnets or permanent magnets are effective primarily as means for supplementing the action of the mechanical elements of the brake in the brake-releasing stage and for retarding the action of the same elements in the brake-setting stage. They not only assist by taking part of the load off the mechanical elements of the brake, but help preclude occurrence of the chattering that characterizes many mechanical brakes and of the hammer effect that characterizes many non-mechanical brakes.

Other objects, advantages and characteristics of the invention will be apparent from the description which follows and from the accompanying drawings in which:

Figure 1 is a central section through the longitudinal axis of a motor brake constructed according to the teachings of the present invention, the parts being shown in brake-set position;

Figure 2 is a similar section showing the parts in brake-released position;

Figure 3 is a side elevation of the camming member forming part of the brake of Figures 1 and 2;

Figure 4:
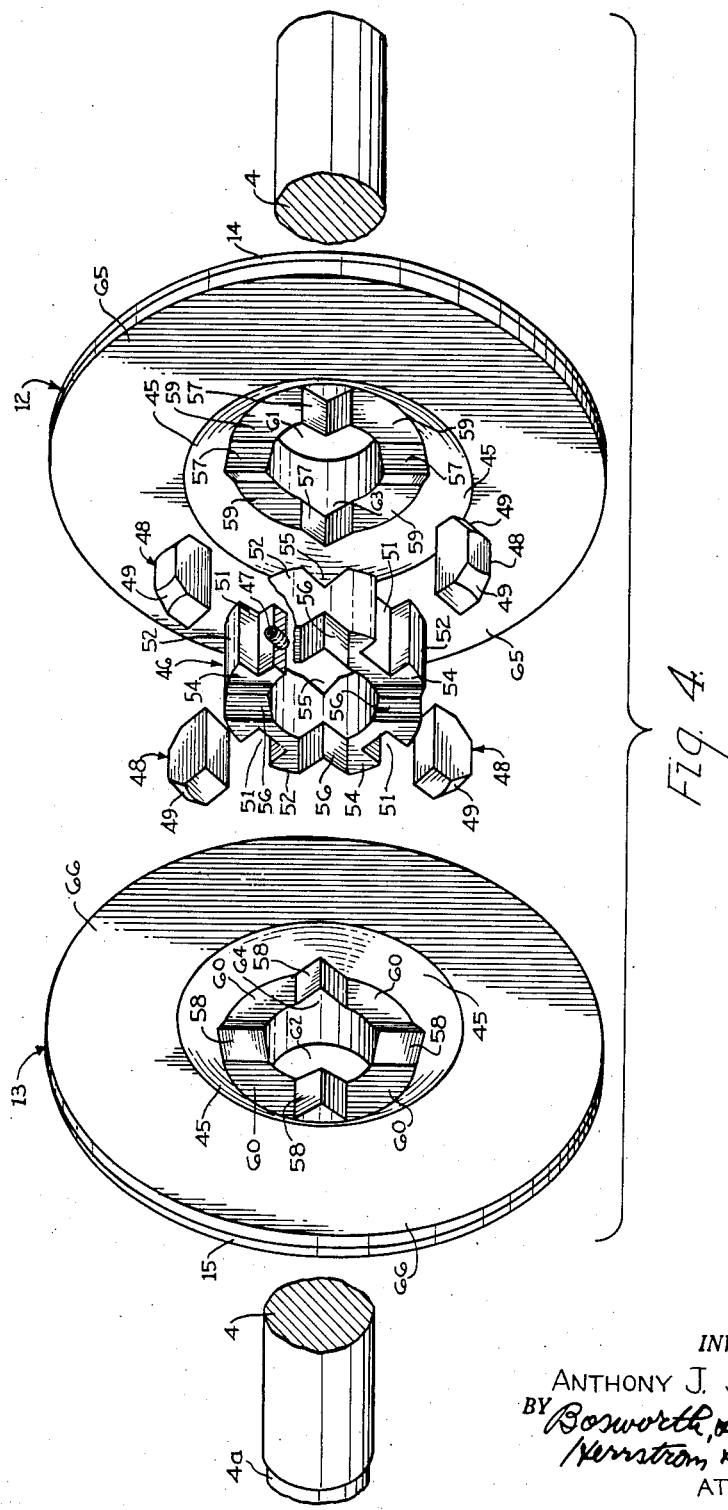
Figure 4 is an exploded view showing in perspective and on a somewhat larger scale the details of the camming member, wedges, and moveable brake elements of the brake of Figures 1 and 2.
Figure 5:
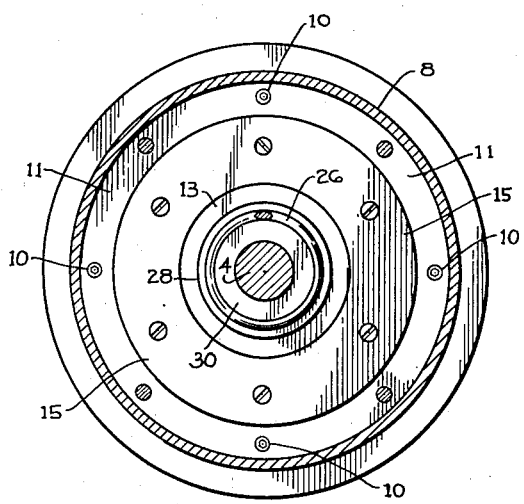
Figures 5 to 7 are sectional elevations of the same brake on lines 5—5, 6—6 and 7—7 of Figure 1, the scale being approximately two-thirds that of Figure 1.
Figure 6:
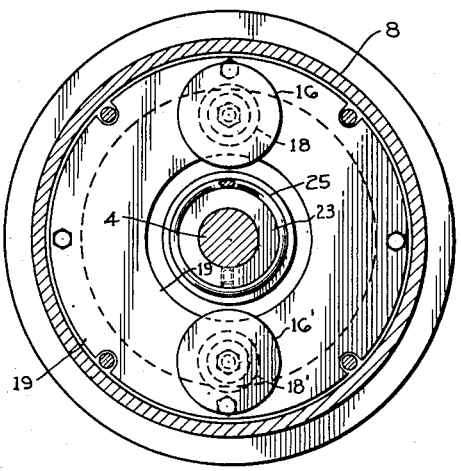

In the drawings, Figures 1 and 2, the motor housing 1 takes the form of a metal shell or framework supporting a conventional stator 2, the latter being mounted in the usual way inside the housing. Rotor 3, likewise of conventional construction, is mounted for rotation with a rotatable shaft 4 that extends axially of the housing. At one end, shaft 4 is stepped as at 4a and 4b to fit within the usual ball bearing assembly 5 and hub cap 6. The latter is attached as shown to the usual end bell 7. Between end bell 7 and the main portion of housing 1 is a cylindrical housing extension 8 in which is accommodated the mechanical brake of the present invention.

At 90 degree intervals around the inside periphery of housing extension 8 are inwardly extending ears 9 which are tapped to receive screws 10 for holding in place a stationary brake element 11 of generally annular shape. Stationary brake element 11 preferably is of brake lining material and as such is non-metallic in composition; if desired, however, it may be made of steel or any other suitable metal. When held in place on ears 9, brake element 11 presents two outwardly facing braking surfaces, one on one side and the other on the other side of the brake element itself. In the ordinary case, these two braking surfaces, like stationary brake element 11, will be generally annular in shape.

On opposite sides of stationary brake element 11 are supported two metal brake shoes or moveable brake elements, designated 12 and 13. In the preferred form of the invention illustrated in Figures 1 and 2, moveable brake elements 12 and 13, like stationary brake element 11, are generally annular in shape. They are mounted on shaft 4 in such manner that they can turn with a running fit on the surface of the shaft, although, as will appear hereinafter, the relative angular movement that takes place between shaft 4 and moveable brake elements 12 and 13 is ordinarily of a very small order of magnitude. Both moveable brake elements are also capable of a limited amount of translatory movement axially of the shaft between what has already been referred to as brake-set and brake-released positions. As shown in Figure 1, moveable brake elements 12 and 13 are in brake-set position; i. e., their inwardly facing or braking surfaces are in engagement with the outwardly facing braking surfaces on stationary brake element 11.

In the preferred embodiment of the invention, the non-braking outwardly facing surfaces on the opposite sides of moveable brake elements 12 and 13 are provided, respectively, with generally annular pole pieces 14 and 15, the latter being of soft iron, steel, or any other suitable ferromagnetic or paramagnetic material. Thus the body or main portions of moveable brake elements 12 and 13 may, if desired, be of a non-magnetic metal; by the same token, if the body or main portions of moveable brake elements 12 and 13 are of magnetic material, it will sometimes be possible to dispense with separate pole pieces 14 and 15. If used, pole pieces 14 and 15 can conveniently be mounted by screws in suitable annular recesses on the outer faces of moveable brake elements 12 and 13: see Figures 1 and 2.

Supported from housing 1 within extension 8 thereof are one or more permanent magnets 16, 16', the same being located in juxtaposition or opposite relation to pole piece 14 of moveable brake element 12. Similarly, on the opposite side of brake element 11 one or more permanent magnets 17, 17' are supported in apposition to pole piece 15 of moveable brake element 13. In the construction shown, there are in all four separate magnets, two for each of the moveable brake elements 12 and 13, although it will be obvious that, if desired, three, four or more separate magnets may be provided for each of the moveable brake elements and, particularly if magnets of annular shape are employed, that the total number may be reduced to two by providing one for each of them. Magnets 16, 16' and 17, 17' can be of any suitable material but are preferably formed of the precipitated hardened alloy of aluminum, nickel, cobalt, copper and iron sold under the trademark "Hyflux Alnico V" by the Indiana Steel Products Company, Valparaiso, Indiana.

In the embodiment of the invention illustrated in the drawings, in which magnets 16, 16' and 17, 17' are more or less cylindrical, they can be located in proper relation to the moveable brake element by means of spacers and mounting elements of appropriate dimensions, proportions and shape. Thus magnets 16, 16' may be mounted as shown on positioning collars 18, 18', each of which bears against one of the magnets and against an annular mounting plate 19. Similarly, magnets 17, 17' may be mounted as shown by means of positioning collars 20, 20', each of which bears against an annular mounting plate 21. Screws 22 projecting from the outer faces of mounting plates 19 and 21 through suitably located openings in the plates and thence into tapped extensions at the rear of the magnets themselves serve to draw magnets 16, 16' and 17, 17' into tight engagement with the near ends of positioning collars 18, 18' and 20, 20'.

Magnets 16, 16' and 17, 17' are so located and of such strength that in and of themselves they are ineffective in drawing moveable brake elements 12 and 13 out of brake-set position, particularly if, as in the preferred embodiment of the invention, the moveable brake elements are themselves biased toward brake-set position. Pursuant to the invention, magnets 16, 16' and 17, 17' are secondarily rather than primarily responsible for urging moveable brake elements 12 and 13 into brake-released position; accordingly, they must be so composed, constructed and arranged that they do not in and of themselves pull moveable brake elements 12 and 13 out of the position which these parts occupy in Figure 1. The over-all effectiveness of magnets 16, 16' and 17, 17' is of course a function, among other things, of the size, shape and metallurgical composition of the magnets, of the width of the air gap, and of the size, shape and composition of pole pieces 14 and 15, as well as of the force or forces which tend to urge moveable brake elements 12 and 13 toward and away from brake-set position.

Having due regard to such factors as those just mentioned, it is possible to substitute electro magnets for permanent magnets 16, 16' and 17, 17'; if this is done, they may be actuated from the current source that serves the motor itself.

Rigidly mounted on shaft 4 inwardly of mounting plates 19 and 21 are two moveable spring abutments 23 and 24, each of which, after first loosening a set screw, may be moved along shaft 4 either inwardly toward or outwardly away from stationary brake element 11. By so moving them, it is possible to arrive at the precise degree of adjustment that is needed in coil springs 25 and 26, which surround abutments 23 and 24, respectively, in such fashion that their outer ends bear against radially extending flanges 23a and 24a at the outer ends of the two abutments. Inwardly of flanges 23a and 24a, cylindrical surfaces on abutments 23 and 24 fit snugly but without binding within springs 25 and 26, which rotate with abutments 23 and 24 and shaft 4 at the same angular speed. Springs 25 and 26, which are installed under compression, supply the forces which bias moveable brake elements 12 and 13 toward their brake-set positions.

The inner ends of springs 25 and 26 bear against circular shoulders 27 and 28 formed as shown on moveable brake elements 12 and 13, respectively. Like flanges 23a and 24a, shoulders 27 and 28 serve as spring seats. Outwardly of shoulders 27 and 28, moveable brake elements 12 and 13 are provided with axially projecting extensions of generally cylindrical shape and substantially the same diameter as abutments 23 and 24, thus giving moveable brake elements 12 and 13 the stepped appearance seen in Figures 1 and 2. The end faces of such axially projecting extensions, designated 29 and 30, comprise stop surfaces which, when moveable brake elements 12 and 13 are in brake-set position, are spaced by clearances 31 and 32 from similar but oppositely facing stop surfaces 33 and 34 on abutments 23 and 24, respectively. Like clearances adjoining the inside faces of moveable brake elements 12 and 13 form part of chamber 35, seen in Figure 1.

Clearances 31 and 32, although present when the parts are in brake-set position, tend to disappear when the parts move toward and into the brake-released position shown in Figure 2. Upon the occurrence of such movement, stop surfaces 33 and 34 on abutments 23 and 24 are engaged by stop surfaces 29 and 30 on moveable brake elements 12 and 13, thus limiting the permissible movement of the moveable brake elements in opposition to the forces exerted by springs 25 and 26. It will be noted from a comparison of Figures 1 and 2 that as clearances 31 and 32 disappear, clearances 37 and 38 between pole pieces 14 and 15 and magnets 16, 16' and 17, 17' diminish, remaining as lesser clearances 39 and 40: see Figure 2.

In the drawings, clearances 39 and 40 are exaggerated in the interests of clarity of representation; in actual practice, they are of the order of a few hundredths of an inch. It is quite important that there be no intimate physical contact between pole pieces 14 and 15 and magnets 16, 16' and 17, 17'; if such contact were to occur, friction between pole pieces 14 and 15 and magnets 16, 16' and 17, 17' would tend to keep moveable brake elements 12 and 13 from rotating, precluding free rotation but allowing angular slip between them. To this extent, magnets 16, 16' and 17, 17' would operate to brake the motor even though the parts would supposedly be in brake-released position.

It will also be noted that as clearances 31 and 32 disappear and as clearances 37 and 38 diminish in size to become lesser clearances 39 and 40, new clearances 41 and 42 develop as indicated in Figure 2 between stationary brake element 11 and the adjacent faces of moveable brake elements 12 and 13. At the same time chamber 35, seen in Figure 1, is extended endwise to become enlarged chamber 43, seen in Figure 2. As there shown, the ends of chamber 43 are defined by surfaces 44 and 45, the former of which appear to extend radially to shaft 4 and the latter of which appear to make an angle of about 45 degrees to the axis of the shaft. Surfaces 45 are in fact frusto-conical, as shown by Figure 4.

Within chamber 43 a cam-like element 46 is rigidly mounted on shaft 4 by means of a set screw 47 or, if desired, by means of a key or pin that requires it to rotate with the shaft. Although, strictly speaking not a cam in the ordinary sense of the term, cam-like element 46 is of the nature of a symmetrically formed end cam. It has a camming function, as will appear below. In addition, it mounts a plurality of radially moveable wedges 48 provided with arcuate surfaces 49 which, like frusto-conical surfaces 45, make an angle of 45 degrees to the axis of rotation of the shaft. Surfaces 49 appear in Figure 1, wherein they are shown as spaced from frusto-conical surfaces 45, and also in Figures 3 and 4. Except where surfaces 49 impart the wedge-shaped appearance to them, wedges 48 resemble rectangular parallelopipeds. They are generally oblong in shape and, where they co-act with cam-like element 46, have square corners. The arcuate nature of surfaces 49 appears to best advantage in Figure 4.

When the parts are in the brake-set position shown in Figure 1, wedges 48 are out of contact with frusto-conical surfaces 45 on moveable brake elements 12 and 13. As the motor is put into operation and brought up to full speed, represented by the brake-released condition shown in Figure 2, wedges 48 move radially outward under the influence of centrifugal forces until arcuate surfaces 49 on wedges 48 make contact with frusto-conical surfaces 45 on moveable brake elements 12 and 13, thus developing the clearance 50 that appears behind wedges 48 in Figure 2. Because their action depends in part on the effect of centrifugal forces, wedges 48 may, if desired, be regarded and referred to as wedge-shaped weights.

There are four wedges 48 in the construction shown in the drawings, three of them appearing in Figure 3 and all four appearing in Figure 4. As indicated in the latter, wedges 48 fit into axially extending mounting slots 51 in the exterior surfaces of cam-like element 46. Like wedges 48, slots 51 have straight sides and square corners. Their dimensions are such that wedges 48 fit rather loosely within them, thus facilitating the previously mentioned radial movement of the wedges as the centrifugal forces come into operation. In the preferred embodiment of the invention, wedges 48, measured in a direction paralleling the axis of the shaft 4, are considerably longer than they are wide, the length being roughly three times the width. As most clearly appears from Figure 4, the longitudinal axes of wedges 48, like the axes of slots 51, parallel the axis of the shaft.

Figure 7:
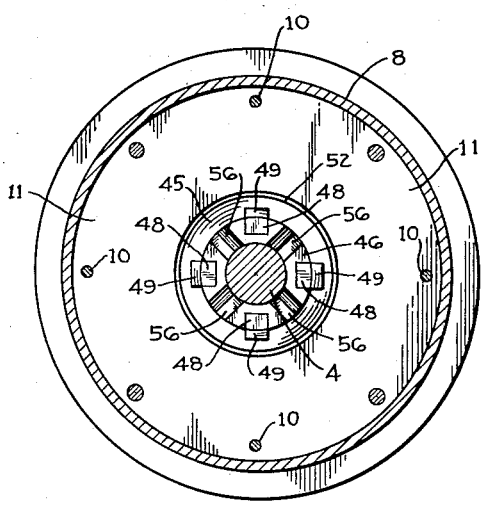
Figure 8:
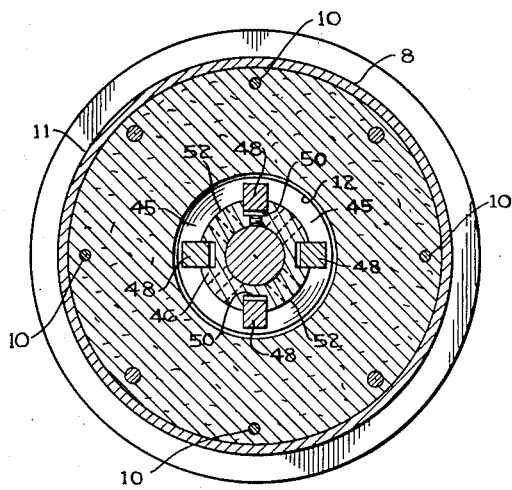
Figure 8 is a similar sectional elevation of the same brake on line 8—8 of Figure 2.

Between slots 51, which are spaced 90 degrees apart around the periphery of cam-like element 46, are four generally cylindrical surfaces 52. These surfaces are so located in relation to the bottoms of slots 51 that when the parts are in brake-set position, wedges 46 project above them out of slots 51. The extent to which wedges 48 project out of slots 51 is not especially important; in general, however, it is preferred to have the greater part of each wedge within a slot 51 when the parts are in brake-set position. In this connection, see Figure 7. Normally, therefore, arcuate surfaces 49 will always be positioned some distance radially outward of cylindrical surfaces 52, this distance being at its maximum when the parts are in brake-released position.

End surfaces 54 of cam-like element 46 may be thought of as if formed by planes normal to the axis of figure of cam-like element 46, which is of course the axis of rotation of shaft 4. However, although generally flat, such end surfaces are not themselves plane; instead, they are provided with radially extending camming grooves 55 and 56 as shown in Figures 3 and 4. There are four camming grooves 55 in one of the two end faces and four camming grooves 56 in the other end face. Camming grooves 55 and 56 are centered midway between slots 51. Thus in each case they are spaced 90 degrees apart. Viewed as in Figure 3, the camming grooves are seen to occur in pairs, there being an oppositely directed camming groove 56 for each camming groove 55. In the preferred form of the invention, illustrated in the drawings, the dihedral angle defined by the two sides of each camming groove is in each instance an angle of 90 degrees, although it might be more or less.

To enable them to co-act as intended with camming grooves 55 and 56 in cam-like element 46, moveable brake elements 12 and 13 are provided as indicated in Figure 4 with triangular prisms 57 and 58, respectively. Such prisms are preferably formed integrally with the main or body portions of moveable brake elements 12 and 13. In each case, they are located in the flat area constituting the base of the saucer-like chamber defined by frusto-conical surface 45. Moveable brake element 12 has four prisms 57, the apices of all of which run radially; moveable brake element 13 has four similarly formed and similarly disposed prisms 58. If, as in the illustrated embodiment of the invention, camming grooves 55 and 56 are characterized by dihedral angles of 90 degrees each, the included angles between the exposed sides of prisms 57 and 58 should likewise be angles of 90 degrees. Thus prisms 57 and 58 constitute follower means by which moveable brake elements 12 and 13 are made to respond to the movement imposed by rotor 3 on shaft 4 and cam-like element 46.

Between adjoining prisms 57 on moveable brake element 12 are flat stretches 59 which extend normally to the axis of the shaft; similarly, between prisms 58 on moveable brake element 13 are flat stretches 60 which extend normally to the shaft axis. These flat stretches comprise the previously mentioned flat areas in which the prisms are located. In moveable brake element 12 prisms 57 extend inwardly out of the plane of the flat area comprised of stretches 59, which is itself interrupted by the central cylindrical opening 61 accommodating shaft 4. In moveable brake element 13 there is a similar cylindrical opening 62. The cylindrical contour of openings 61 and 62 continues across end faces 63 and 64 on prisms 57 and 58, respectively. As appears from Figure 4, braking surfaces 65 and 66 on moveable brake elements 12 and 13, respectively, are spaced from the apices of the prisms, the limited altitude of the prisms measured axially of the shaft being insufficient to enable them to extend inwardly as far as the planes of braking surfaces 65 and 66.

Assuming that the parts are in the brake-set position shown in Figure 1 and that the motor is to be put into operation by closing the electrical circuit from which it is to be driven, excitation of stator 2 produces rotation of rotor 3 and therefore of shaft 4, on which rotor 3 is mounted. Since cam-like element 46 is rigidly mounted on shaft 4 by means of set screw 47, cam-like element 46 rotates at the same angular speed as the shaft itself. In turning, cam-like element 46, acting through cam grooves 55 and 56 and prisms 57 and 58, tends to rotate moveable brake elements 12 and 13; however, as will appear, inertia forces and friction where braking surfaces 65 and 66 engage stationary brake element 11 bring about a condition in which a certain amount of mechanical slippage takes place between cam-like element 46 and prisms 57 and 58.

This slippage, occurring as it does where the exposed sides of prisms 57 and 58 impinge on the inclined faces of cam grooves 55 and 56, causes moveable brake elements 12 and 13 to move axially of shaft 4 just as the moveable brake elements begin to rotate with it. The direction of the axial movement is necessarily such as to open up clearances 41 and 42 between the stationary and moveable brake elements and to develop the enlarged chamber 43 at the ends of cam-like element 46 (Figure 2). Complete disengagement of prisms 57 and 58 from cam grooves 55 and 56 cannot occur, being precluded by the contact which shortly comes about between stop faces 29 and 30 on moveable brake elements 12 and 13 and stop faces 33 and 34 on abutments 23 and 24, respectively.

In the meanwhile, wedges 48, being free to move in slots 51, respond by movement in a radial direction to the centrifugal forces brought into operation by the rotation of shaft 4 and cam-like element 46. As the centrifugal forces increase due to the increased speed of rotation of shaft 4, wedges 48 tend to move farther away from the bottoms of slots 51, opening up thereby the clearances 50 shown in Figure 2. In responding to these forces, the arcuate faces 49 on wedges 48 come into contact with frusto-conical surfaces 45 on moveable brake elements 12 and 13. After this happens, arcuate surfaces 49 operate to urge frusto-conical surfaces 45 away from each other, thus supplementing the action of cam-like element 46 on the follower means incorporated in moveable brake elements 12 and 13.

The stop action which occurs as already described when stop faces 29 and 30 on moveable brake elements 12 and 13 come into contact with stop faces 33 and 34 precludes further radial movement of wedges 48 after the parts have attained the brake-released position illustrated in Figure 2.

In the meanwhile, however, clearances 37 and 38 (Figure 1) will have been reduced to a point where only lesser clearances 39 and 40 (Figure 2) separate pole pieces 14 and 15 from magnets 16, 16' and 17, 17'. Although the magnets are ineffective, so far as concerns their action on pole pieces 14 and 15, when the parts are in the brake-set position, displacement of moveable brake members 12 and 13 axially of shaft 4 brings pole pieces 14 and 15 within the effective range of magnets 16, 16' and 17, 17'. Thereafter, the latter tend to hold moveable brake elements 12 and 13 in the brake-set position shown in Figure 2, in this respect supplementing the mechanical action of wedges 48.

The combined action of the magnets, the wedges and the co-acting surfaces on cam-like element 46 and the follower means incorporated in moveable brake elements 12 and 13 overcomes the tendency of coil springs 25 and 26 to force moveable brake elements 12 and 13 back into brake-set position. Each supplements the other to an extent such that the compressive forces exerted by springs 25 and 26 on moveable brake elements 12 and 13 are largely overcome. So long as current is supplied to stator 2 and rotor 3, even though the load on the motor may be severe, cooperation between these components of the motor brake of the present invention operates to keep the parts in the brake-released position illustrated in Figure 2.

When, however, the supply of current is interrupted, slippage in the opposite angular direction tends to occur between prisms 57 and 58 on one hand and cam grooves 55 and 56 on the other. At the same time, an attendant reduction in the magnitude of the centrifugal forces applicable to wedges 48 causes them to retract from the advanced position which they occupy when the parts are as shown in Figure 2, thus narrowing and finally eliminating the clearances 50 (Figure 2). With this slippage in the opposite angular direction and the accompanying retraction of wedges 48, the forces operating in opposition to coil springs 25 and 26 are no longer sufficient to withstand the compressive forces exerted by the springs on moveable brake elements 12 and 13, respectively. As a result, the springs are enabled to overcome magnets 16, 16' and 17, 17' and thereafter are free to urge moveable brake elements 12 and 13 into brake-set position, this notwithstanding the presence of pole pieces 14 and 15. All of these several steps are accomplished smoothly, quietly and with a minimum of lost time.

Thus the invention provides a mechanical brake for a dynamo-electric machine, particularly a motor, in which both the operation of braking of the motor and the operation of releasing it from brake-set position are effected promptly, without chattering, and with little or none of the hammer effect that sometimes characterizes the so-called electric brake. All of this is made possible by the provision of a plurality of cooperating instrumentalities through which the braking and de-braking steps are accomplished, one such instrumentality being the magnet or magnets, another the retractable wedges which ride in the previously described guiding slots in the cam-like element, and still another being the camming elements associated with the motor shaft, including the cam-like element itself and the follower means on the moveable brake elements. The action of the mechanical elements is supplemented by the action of the magnets; on the other hand, when the current is interrupted, the braking effect, which commences virtually as soon as the motor shaft begins to lose speed, is retarded by the presence of the magnets, which continue to operate on the moveable brake elements until they are themselves overcome by the action of the springs.

Although the invention has been described in the form which it takes in its preferred embodiment, it is evident that changes by way of simplification or elaboration may be made by those skilled in the art. Thus the invention need not be executed in a form in which there are two moveable brake elements co-acting with a single stationary brake element but may be simplified by eliminating one of the moveable brake elements, the pole piece associated with it, and the magnet or magnets that co-act with the pole piece, leaving a simplified variation of the brake which essentially is unilateral rather than symmetrical in character.

Also, it is apparent that in some circumstances it may be possible to dispense with one or more of the components of the brake shown in the accompanying drawings; for example, the retractable wedges may, under some conditions, be omitted, reliance being placed on the action of the cam-like element, the follower means on the moveable brake elements, and the magnet or magnets. Conversely, in brakes intended for some of the smaller fractional horsepower motors, the magnet or magnets and associated pole pieces in the moveable brake elements may in some cases be omitted, reliance being placed on the camming elements and the retractable wedges. Other changes of like nature may readily be made by those skilled in the art to which the invention pertains.

It is intended that the patent shall cover, by summarization in the appended claims, all features of patentable novelty residing in the invention.

What is claimed is:

1. In a dynamo-electric machine, a housing; a rotatable shaft within the housing; a stationary brake element within the housing; a moveable brake element within the housing in juxtaposition to the stationary brake element, said moveable brake element being moveable axially of the shaft between a brake-set position in which it is in engagement and a brake-released position in which it is out of engagement with the stationary brake element; camming means for urging the moveable brake element out of brake-set position, said camming means being rotatable with the shaft; follower means in apposition to the camming means, said follower means being movable with the moveable brake element; and, disposed between the camming means and the follower means, a plurality of radially moveable wedges for supplementing the action of the camming means in urging the moveable brake element out of brake-set position.

2. A dynamo-electric machine as in claim 1 in which, although free to move radially, the wedges are guided in their movement by surfaces on the camming means so located that the wedges are compelled to rotate with the camming means.

3. A dynamo-electric machine as in claim 2 in which mounting slots in the periphery of the camming means guide the wedge in their radial movement.

4. A dynamo-electric machine as in claim 3 in which the surfaces of the wedges responsible for the wedging action are opposed by surfaces of complementary shape on the moveable brake element.

5. In a dynamo-electric machine, a housing; a shaft within the housing; a stationary brake element within the housing; a moveable brake element within the housing in juxtaposition to the stationary brake element, said moveable brake element being moveable axially of the shaft between a brake-set position in which it is in engagement and a brake-released position in which it is out of engagement with the stationary brake element; rotatable means on the shaft for moving the moveable brake element toward brake-released position; follower means in apposition to the rotatable means, said follower means being movable with the moveable brake element; and, disposed between the rotatable means and the follower means, retractable element supplementing the action of the rotatable means in moving the moveable brake element toward brake-released position, portions of said retractable elements engaging said rotatable means and other portions thereof being engageable by said follower means.

6. A dynamo-electric machine as in claim 5 in which the rotatable means comprise a cam-like element mounted on the shaft.

7. A dynamo-electric machine as in claim 6 in which the cam-like element is of the nature of an end cam.

8. A dynamo-electric machine as in claim 7 in which, as seen from the end, the cam-like element is characterized by lateral symmetry of figure.

9. A dynamo-electric machine as in claim 8 in which the end face of the cam-like element is characterized by a plurality of equally spaced camming grooves.

10. In a dynamo-electric machine, a housing; a shaft within the housing; a stationary brake element within the housing; a moveable brake element within the housing in juxtaposition to the stationary brake element, said moveable brake element being moveable axially of the shaft between a brake-set position in which it is in engagement and a brake-released position in which it is out of engagement with the stationary brake element; camming means for moving the moveable brake element out of the brake-set position, said camming means being mounted on the shaft; follower means in apposition to the camming means, said follower means being moveable with the moveable brake element; and, supported from the housing, a magnet for supplementing the action of the camming means in moving the moveable brake element out of brake-set position.

11. In a dynamo-electric machine, a supporting structure; a permanent magnet within the supporting structure; a stationary brake element within the supporting structure; a moveable brake element within the supporting structure in apposition to the magnet, said moveable brake element being moveable between a brake-set position in which it is in engagement and a brake-released posititon in which it is out of engagement with the stationary brake element; a shaft mounted for rotation in the supporting structure; and, mounted on and rotatable with the shaft, means for moving the moveable brake element out of brake-set position into the zone of effectiveness of the magnet whereby the latter is enabled to complete the movement of the moveable brake element into its brake-released position.

12. A dynamo-electric machine as in claim 11 in which said means include a cam-like member rigidly mounted on the shaft.

13. A dynamo-electric machine as in claim 12 in which the cam-like member mounts a plurality of speed-responsive elements adapted to act on one of the brake elements.

14. A dynamo-electric machine as in claim 13 in which the speed-responsive elements take the form of wedges susceptible of radial movement under the influence of centrifugal force.

15. In a dynamo-electric machine, a supporting structure; a plurality of magnets within the supporting structure; a stationary brake element supported from the supporting structure midway between the magnets; a plurality of moveable brake elements disposed between the magnets and the stationary brake element, said moveable brake elements being moveable between brake-set positions in which they are in engagement and brake-released positions in apposition to the magnets in which they are out of engagement with the stationary brake element; a shaft mounted for rotation in the supporting structure; and, encompassing the shaft, means for moving the moveable brake elements out of brake-set position into the zones of effectiveness of the magnets whereby the latter are enabled to complete the movement of the moveable brake elements into their brake-released positions.

16. In a dynamo-electric machine, a housing; a rotatable shaft within the housing; a stationary brake element within the housing; moveable brake elements within the housing on opposite sides of the stationary brake element, said moveable brake elements being moveable between brake-set positions in which they are in engagement and brake-released positions in which they are out of engagement with the stationary brake element; rotatable means for moving the moveable brake elements out of brake-set position, said rotatable means being mounted on the shaft; follower means engaging the rotatablbe means, said follower means being movable with the moveable brake elements; and, supported from the housing, a plurality of magnets, at least one on each side of the stationary brake element, for supplementing the action of the rotatable means in moving the moveable brake elements into brake-released position.

17. In a motor or the like, a housing; a rotor within the housing; a shaft within the rotor; a stationary brake element supported from the housing; movable brake elements on opposite sides of the stationary brake element, said moveable brake elements being moveable axially of the shaft between brake-set positions in which they are in engagement and brake-released positions in which they are out of engagement with the stationary brake element; means for moving the movable brake elements out of brake-set positions, said means including a plurality of retractable wedges responsive to centrifugal forces resulting from the operation of the motor; stop means for limiting the movement of the movable brake elements into brake-released positions; and resilient means for returning the movable brake elements to brake-set positions.

18. In a motor or the like, a housing; a rotor within the housing; a shaft within the rotor; a stationary brake element supported from the housing; a movable brake element in juxtaposition to the stationary brake element, said moveable brake element being moveable axially of the shaft between a brake-set position in which it is in engagement and a brake-released position in which it is out of engagement with the stationary brake element; means for urging the movable brake element toward brake-released position, said means including a plurality of retractable wedges responsive to centrifugal forces resulting from the operation of the motor; means operating to limit the movement of the movable brake element toward brake-released position; and spring means for returning the movable brake element to brake-set position.

19. In a motor or the like, a housing; a rotor within the housing; a shaft within the rotor; a stationary brake element supported from the housing, first and second frusto-conical elements adapted to rotate with the shaft, at least one of said frusto-conical elements being slideable lengthwise of the shaft into and out of braking engagement with the stationary brake element; wedge-mounting means between said first and second frusto-conical elements, said wedge-mounting means being rotatable with the shaft; a plurality of retractable wedges, intervening between said wedge-mounting means and said first and second frusto-conical elements, said wedges being adapted to move away from the shaft under the influence of centrifugal forces; and a plurality of return springs tending to bias the parts toward their brake-set positions.

20. A motor as in claim 19 in which the wedge-mounting means are mounted on the shaft.

21. A motor as in claim 19 in which the wedge-mounting means take the form of a slotted cylinder.

22. In a motor or the like, a housing; a rotor within the housing; a shaft within the rotor; a stationary brake element supported from the housing; a movable brake element in juxtaposition to the stationary brake element, said moveable brake element being moveable axially of the shaft between a brake-set position in which it is in engagement and a brake-released position in which it is out of engagement with the stationary brake element; means tending to move the movable brake element out of engagement with the stationary brake element, said means incorporating a plurality of retractable wedges responsive to centrifugal forces resulting from the operation of the motor; and resilient means tending to move the movable brake element into engagement with the stationary brake element.

References Cited in the file of this patent

UNITED STATES PATENTS

| | | |
|---|---|---|
| 1,994,588 | Nakashian | Mar. 19, 1935 |
| 2,693,254 | Barish | Nov. 2, 1954 |
| 2,695,692 | Dorton | Nov. 30, 1954 |